United States Patent [19]

Cota et al.

[11] Patent Number: 4,586,142
[45] Date of Patent: Apr. 29, 1986

[54] PRESSURIZED CABLE-SHEATH LEAK LOCATING INSTRUMENT

[76] Inventors: Albert O. Cota, 17475 Flanders St., Granada Hills, Calif. 91344; Dean C. Obray, 624 23rd St., Manhattan Beach, Calif. 90266

[21] Appl. No.: 469,790

[22] Filed: Feb. 25, 1983

[30] Foreign Application Priority Data

Feb. 23, 1982 [JP] Japan ................................ 57-28434

[51] Int. Cl.⁴ .......................................... G01M 3/28
[52] U.S. Cl. .................................... 364/507; 364/510; 73/40.5 R
[58] Field of Search ................. 364/507, 510; 73/40.5, 73/861.58

[56] References Cited

U.S. PATENT DOCUMENTS

| | | | |
|---|---|---|---|
| 3,964,292 | 6/1976 | Jackson | 73/40.5 R |
| 3,987,662 | 10/1976 | Hara et al. | 364/507 X |
| 4,007,628 | 2/1977 | Worcester | 73/40.5 R |
| 4,106,099 | 8/1978 | Elliott et al. | 364/510 |
| 4,201,079 | 5/1980 | Worcester | 73/40.5 R |
| 4,289,019 | 9/1981 | Claytor | 364/510 X |
| 4,306,446 | 12/1981 | Fukuda | 364/510 X |
| 4,437,336 | 3/1984 | Abe | 73/40.5 R X |
| 4,480,251 | 10/1984 | McNaughton et al. | 73/40.5 R X |

*Primary Examiner*—Edward J. Wise
*Attorney, Agent, or Firm*—Albert O. Cota

[57] ABSTRACT

A portable instrument used by maintenance technicians to assist in locating an air leak in a pressurized cable sheath. The instrument functions by limiting the area of search thus, permitting a timely repair of the leak to be made. The instrument is comprised of a set of pneumatic hoses that connect the instrument to the cable sheath; a pressure and flow transducer that respectively convert the pressure and flow to proportional d-c voltages; and an analog-to-digital converter that converts the analog voltages to equivalent d-c signals. The digital signals are applied to an electronics calculator that in combination with a keyboard and a computer program solves a set of mathematical equations that when solved, limit the area of search and ultimately provide the location of the air leak. The leak location data is viewed on a digital display and/or the data can be permanently recorded on a hard copy printer.

19 Claims, 20 Drawing Figures

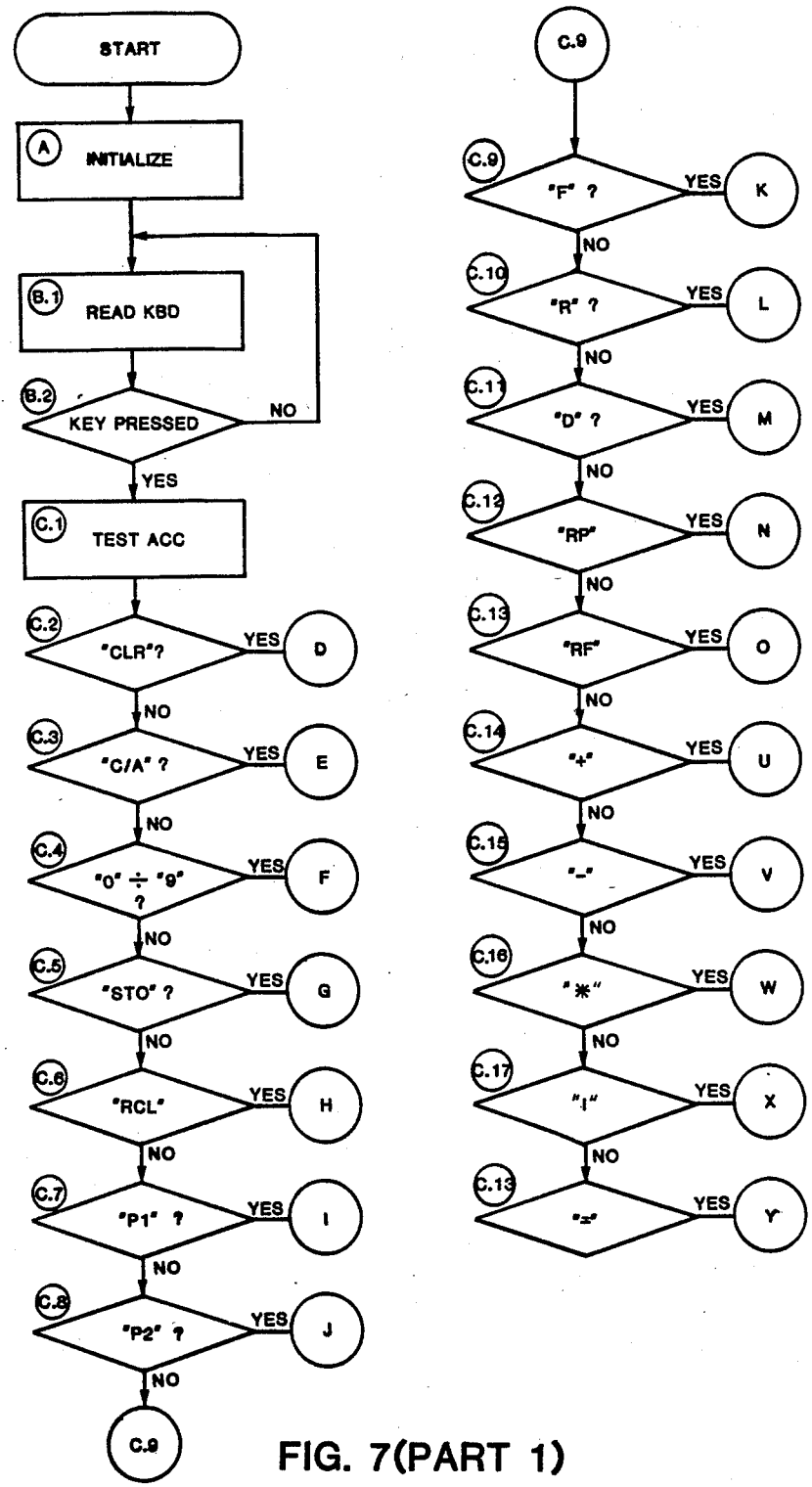
FIG. 7(PART 1)

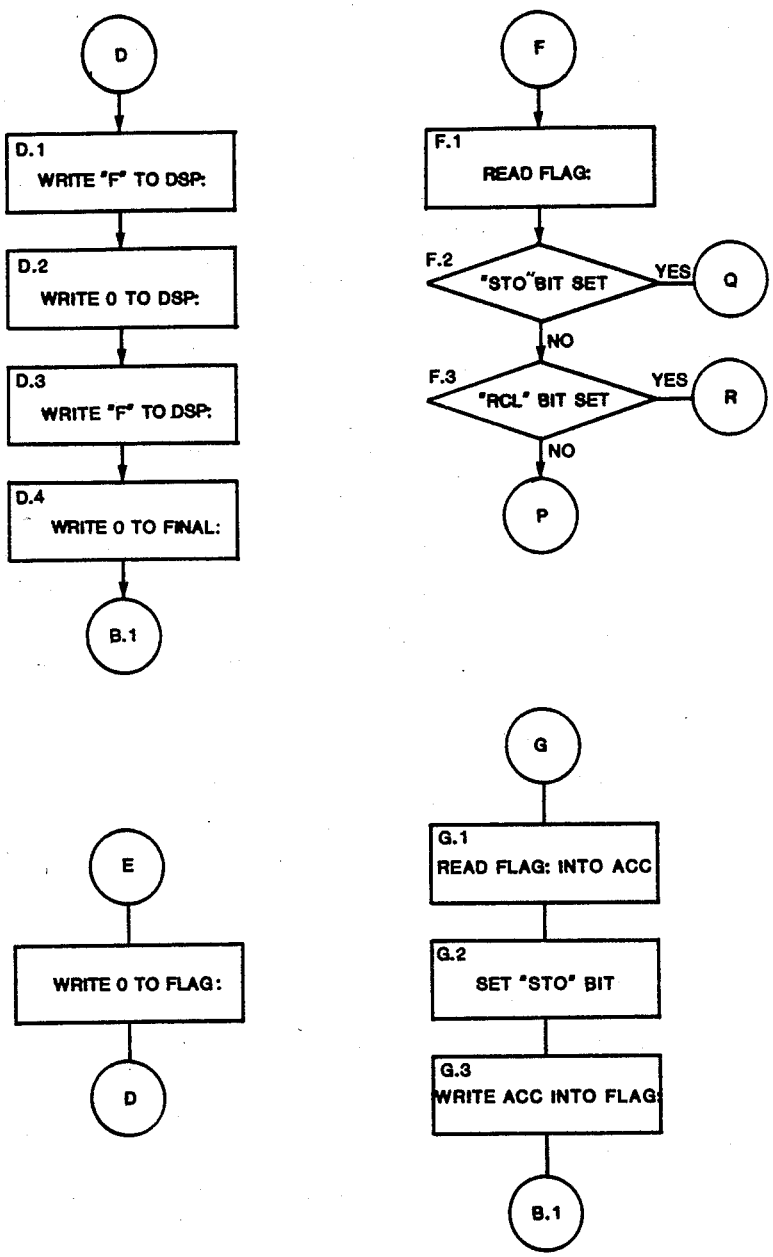
FIG. 7(PART 2)

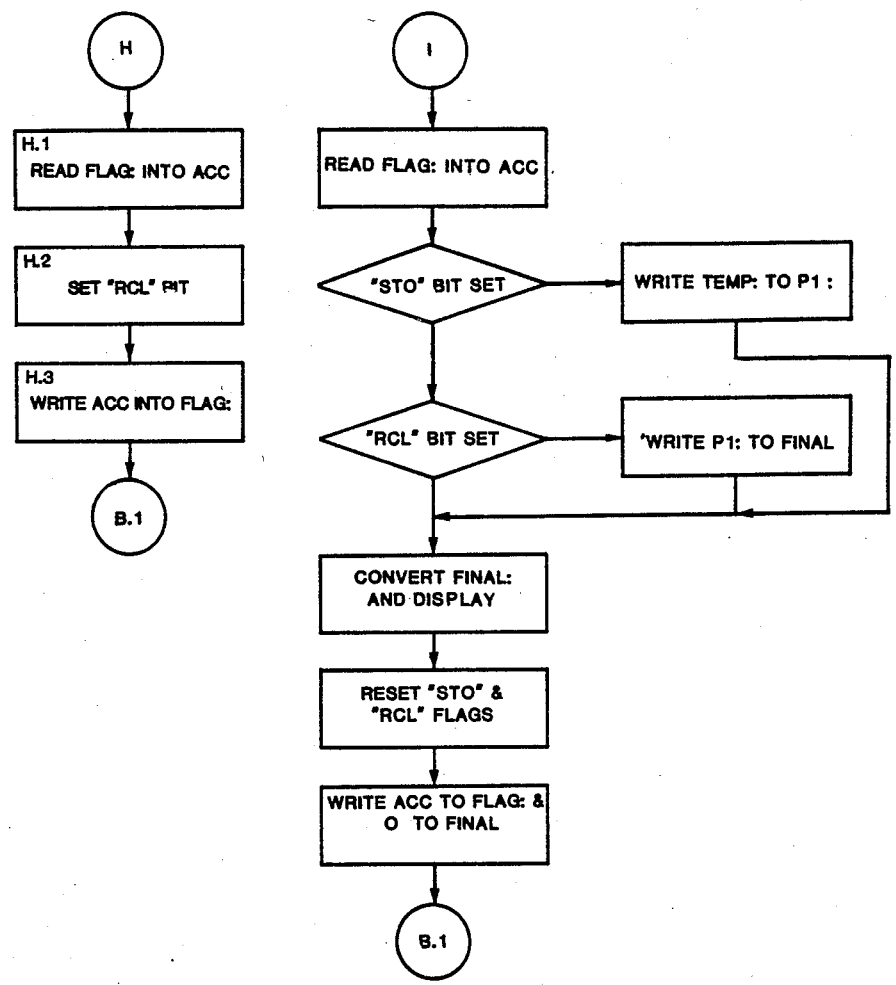
FIG. 7(PART 3)

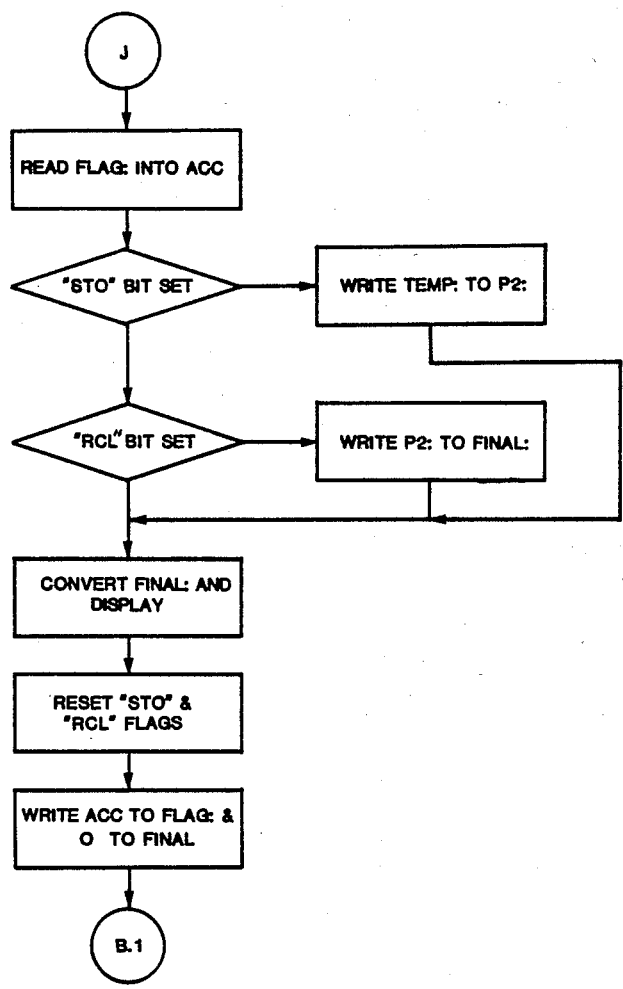
FIG. 7 (PART 4)

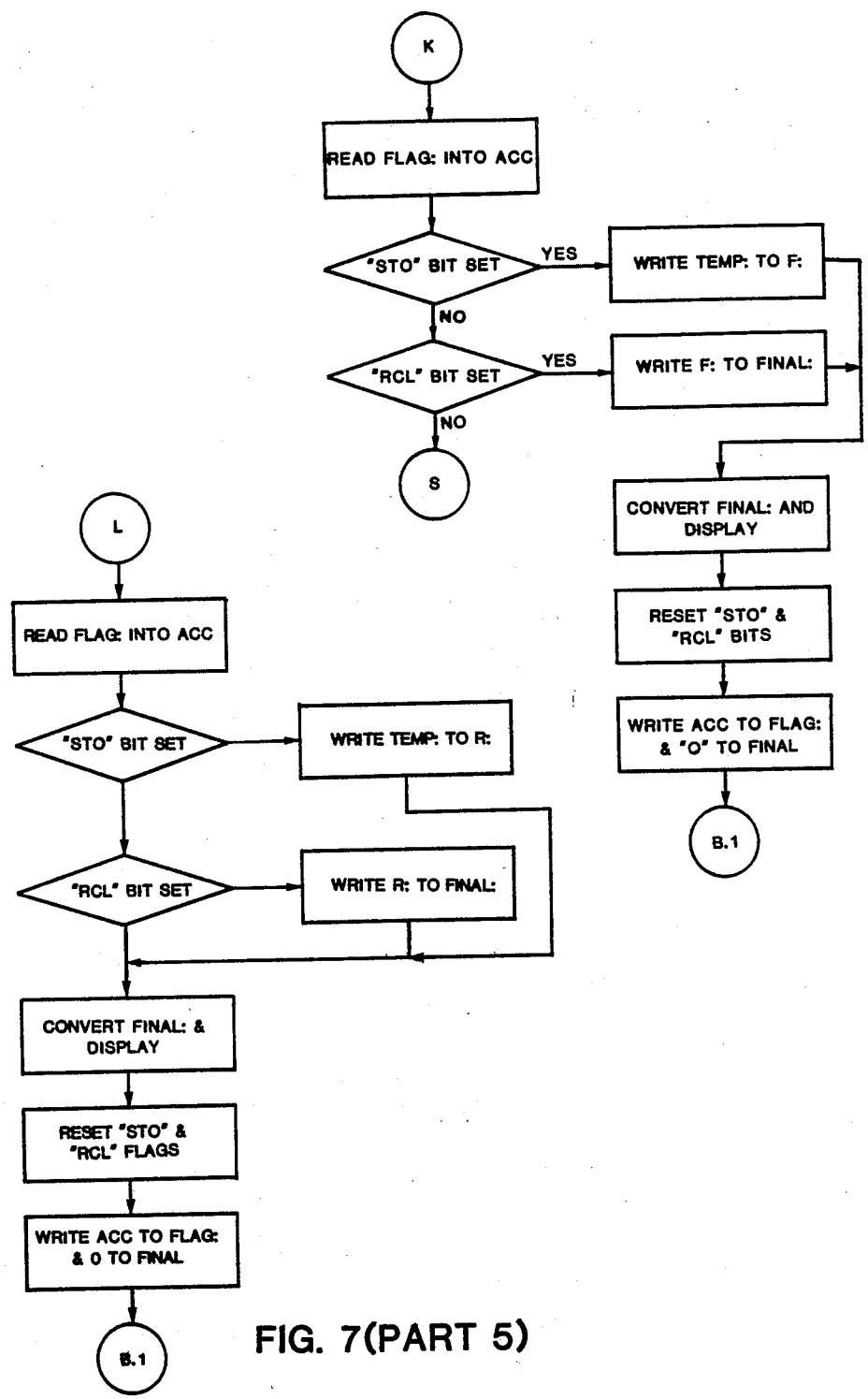
FIG. 7(PART 5)

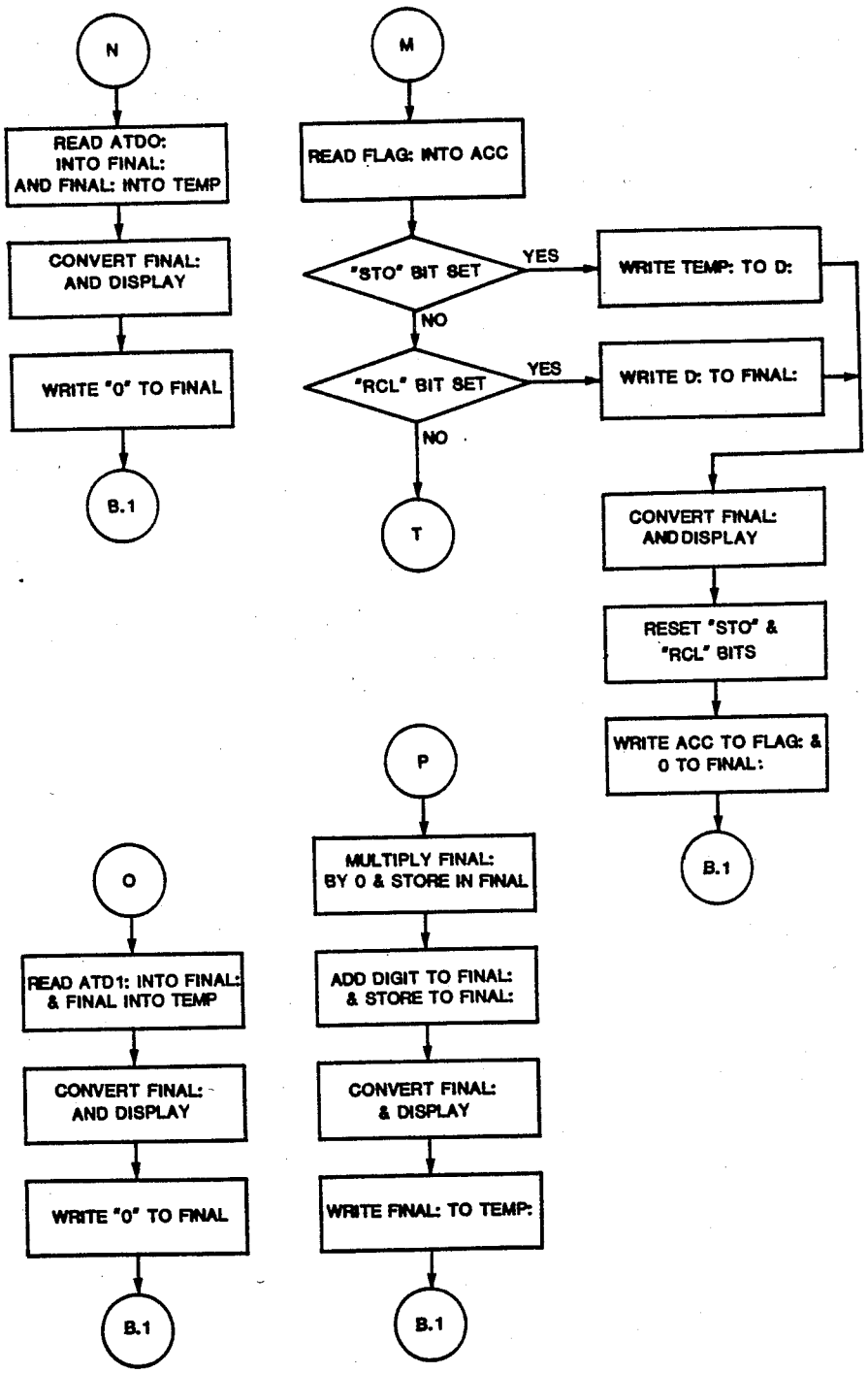
FIG. 7(PART 6)

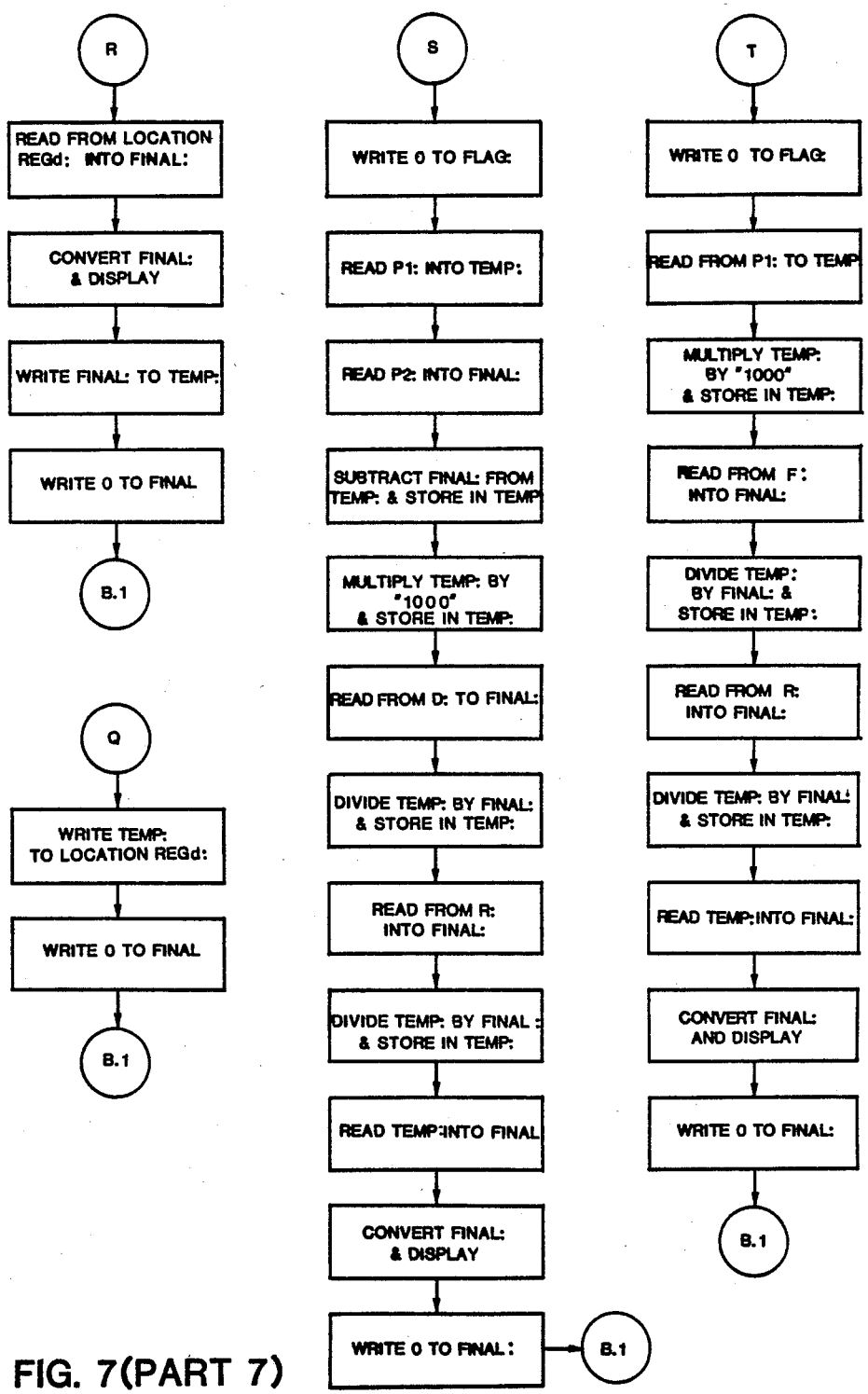
FIG. 7(PART 7)

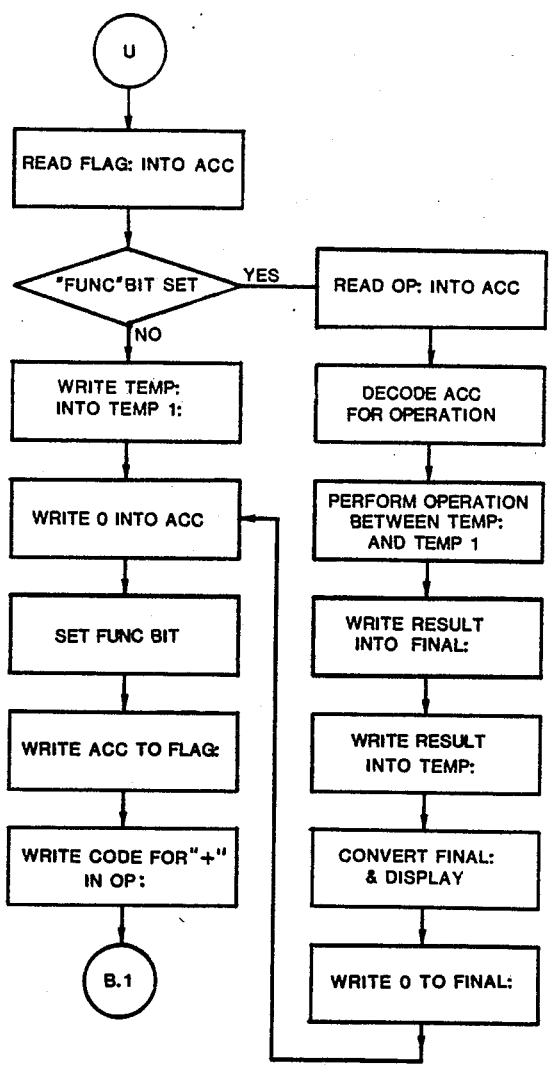
FIG. 7(PART 8)

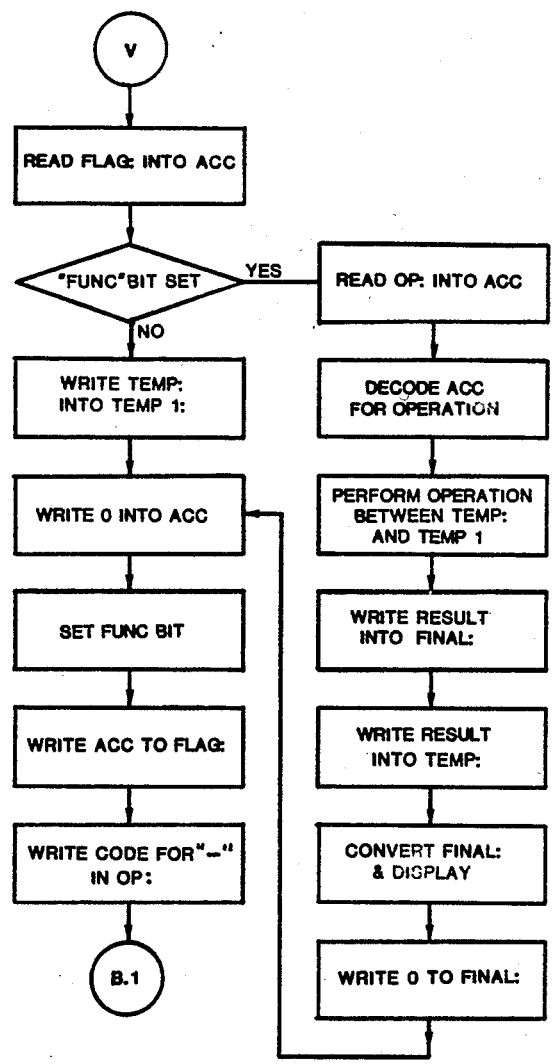
FIG. 7(PART 9)

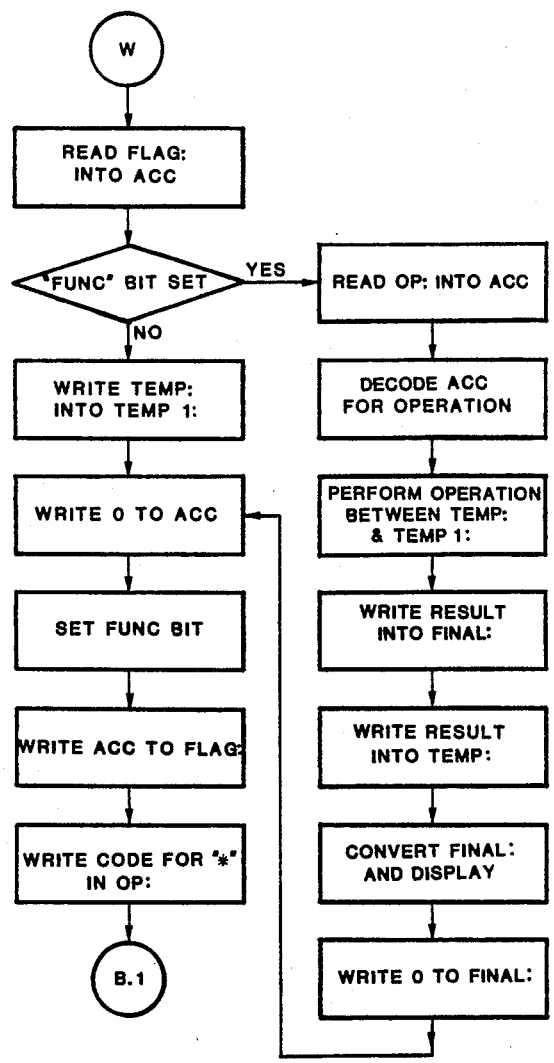
FIG. 7(PART 10)

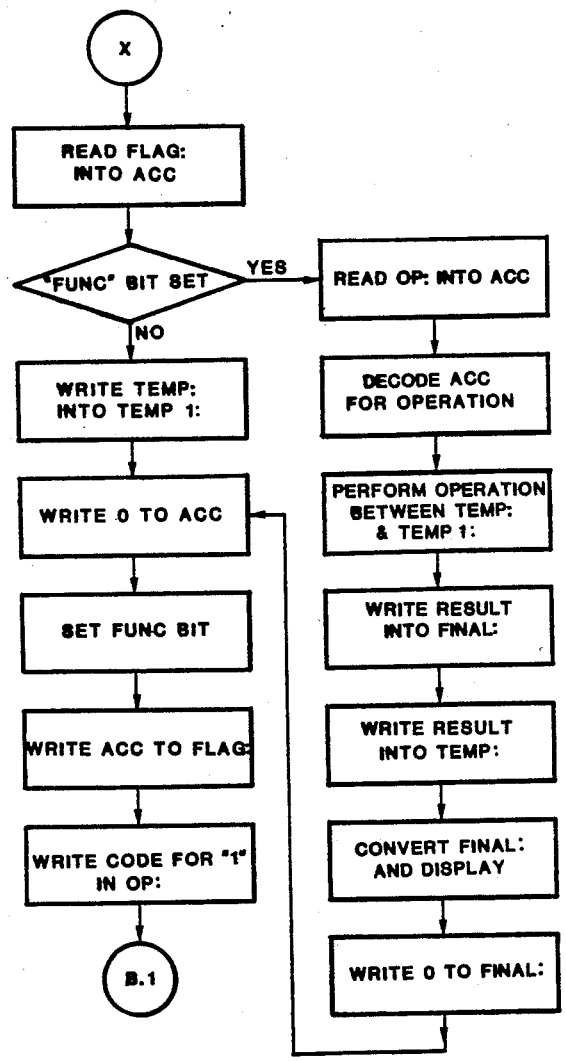
FIG. 7(PART 11)

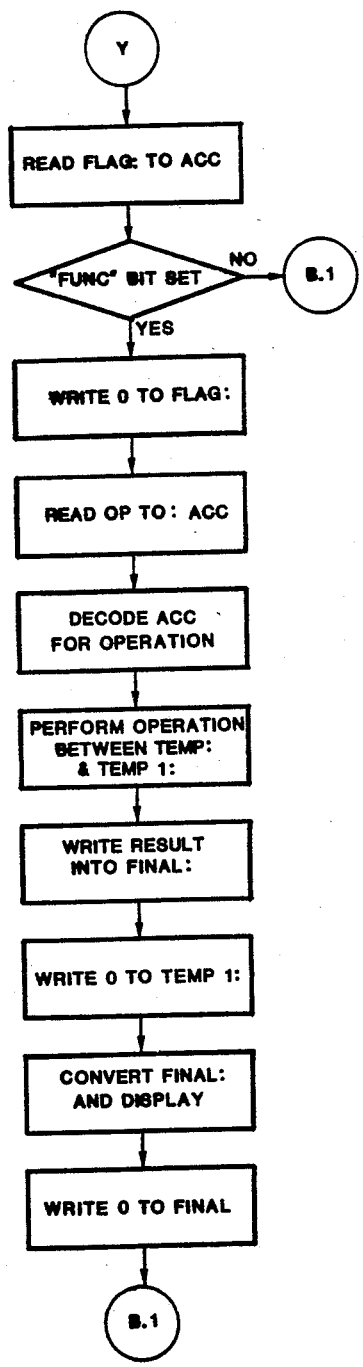
FIG. 7 (PART 12)

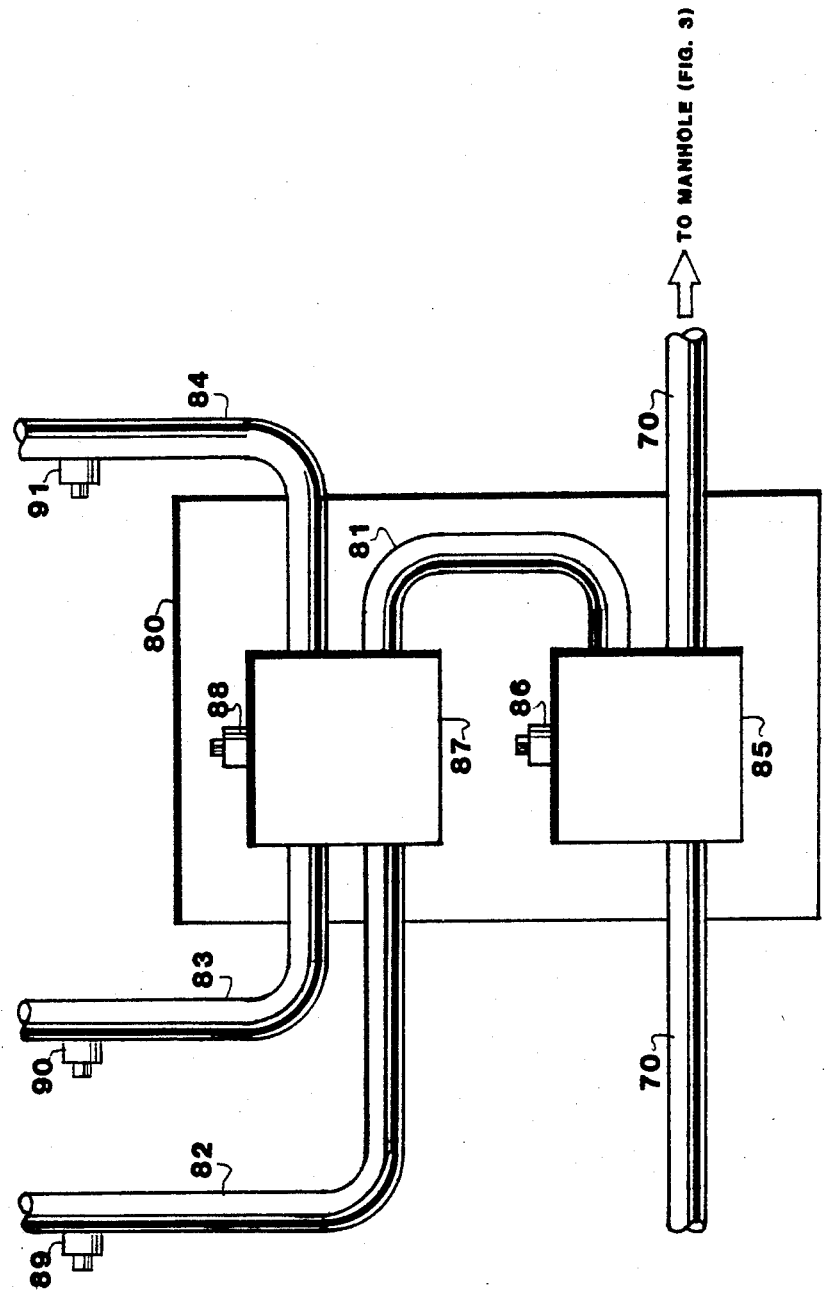

PRESSURIZED CABLE-SHEATH LEAK LOCATING INSTRUMENT

TECHNICAL FIELD

This invention pertains to the general field of air pressure and air flow metering instruments and more particularly to portable instruments that synergistically combine pneumatic and electronic components with a computer program to digitally indicate the maximum distance of an air leak in a pressurized cable sheath.

BACKGROUND ART

Telephone and related communication companies transmit electrical signals through a plurality of communication conductors that are bound together and housed within a cable sheath. To maintain the conductors in a dry condition, the sheath is pressurized with a low humidity gas, i.e., nitrogen, or dry air supplied from a compressor dehydrator. The gas or dry air (herein after referred to as "air") is introduced into the sheath at approximately ten pounds pressure. If a sheath leak occurs, the outward pressure of the air prevents the inward penetration of moisture into the sheath interior. If the leak can be located within a reasonable time, the entry point of the moisture can be repaired and the dry and dehumidified air ambient interior of the individual communication conductors preserved.

A typical pressurization system includes a central office compressor-dehydrator that supplies dehumidified air via a B-meter panel to individual cable sheaths and via a pipe-alarm panel to an air pipe system that supplies the air to a series of manifolds located in a manhole run. Each manifold has five outlets, with each outlet pressurizing an individual cable sheath enclosing 900 to 3600 paired conductors. The pressure in each sheath is remotely measured at the central office by utilizing pressure transducers that are placed at approximately 6000 foot intervals preferably between manifolds.

The current method used to locate cable sheath air leaks is to remotely detect and measure the pressure drop and the air-flow rate in the pressurized cable. Measurements have been tried from both the central office meter panels and at the individual manhole locations where the manifolds are located.

Measurements taken from the central office can only grossly evaluate an entire cable section and is of little or no help in locating or evaluating, with any precision, the location of the leak beyond the first manifold.

Measurements taken at the individual manholes are accomplished by sending maintenance technicians to the suspected manhole location. The technicians are required to (1) open and enter the manhole, (2) take pressure readings with a pressure gauge, (3) measure the flow rate with a portable flow rater, (4) determine direction of flow with a directional flow indicator and (5) proceed to adjacent manholes to take additional readings. Considerable time is used and readings from one manhole to another are often confused and/or lost. The end result is that individual sheath leaks in many cases cannot be satisfactorily located within a time interval to permit a repair that will prevent an interruption of communication.

A search of the prior art did not disclose any patents or publications that were directly related to the instant invention. However, the following U.S. patents were considered in the investigation and evaluation of the prior art.

| PATENT NUMBER | INVENTOR | ISSUED | |
|---|---|---|---|
| 4,201,079 | Worcester | 6 May | 1980 |
| 4,007,628 | Worcester | 15 February | 1977 |
| 3,964,292 | Jackson | 22 June | 1976 |

The Worcester patents disclose a method and an apparatus for remotely monitoring gas leakage in communication cables. The invention consists of attaching, in series with a manhole manifold, a volume flow meter. The meter can be remotely sampled to provide an indication of the gas flow through the meter. Through a network of such meters, in combination with conventional pressure transducers, cable gas leaks can be detected, measured, located and repaired.

The Jackson patent discloses an apparatus and method for detecting a gas leak occurring at any point along a path. A tubing having a wall through which the gas readily permeates is provided. This tubing is structured so that the gas can enter the tubing only by permeating the tubing wall. The gas detection and approximate location of permeation is achieved by withdrawing the gas within the tubing while monitoring both the withdrawn gas and the elapsed time.

DISCLOSURE OF THE INVENTION

The pressurized cable-sheath leak locating instrument consists of a portable device that permits one person to analyze and subsequently locate a gas leak in a pressurized cable sheath. The instrument functions by narrowing the area of search which can result in a more timely repair of the leak.

Communication conductors of the type employed by telephone and related communication companies are enclosed within an air pressurized cable sheath where the air flowing through the sheath maintains the conductors in a dry condition. When a leak occurs it is necessary to expeditiously locate and repair the leak before moisture enters the puncture causing an eventual interruption in the communication service.

Current leak locating test equipment, as described in the BACKGROUND ART section are both not cost effective, in terms of manhours used and leaks are often not located in time to prevent moisture from penetrating the sheath. These problems are solved by the invention in that only one instrument operated by one person is all that is required to timely locate and repair the leak.

The instrument is primarily comprised of pneumatic hoses and connectors that interface with the cable sheath; a set of transducers that convert air pressure and flow rates to proportional d-c voltages; and an analog-to-digital converter that converts the analog d-c voltages to equivalent digital signals. The digital signals are, in turn, applied to an electronics calculator that in combination with a keyboard and a computer program solve a set of mathematical equations that when solved provide distance and airflow data that is used to greatly limit the area of search. The data may be viewed on a digital display or on a hard-copy printer both of which are located on the instrument face.

In addition to providing an instrument that accurately assists in determining the location of a sheath leak in a timely manner it is also an objective of the invention to have an instrument that:

can be easily understood and used by maintenance personnel,
can be easily maintained when necessary,
is cost effective in terms of manhours saved, and
is reliable and relatively maintenance free.

BRIEF DESCRIPTION OF THE DRAWINGS

The details of the invention are described in connection with the accompanying drawings in which:

FIGS. 7(1)–7(11) are computer program flow diagrams.

FIG. 8 is a block diagram of an adjacent distribution manhole showing a pair of splice cases and three lateral cable sheaths.

BEST MODE FOR CARRYING OUT THE INVENTION

Figure 1:
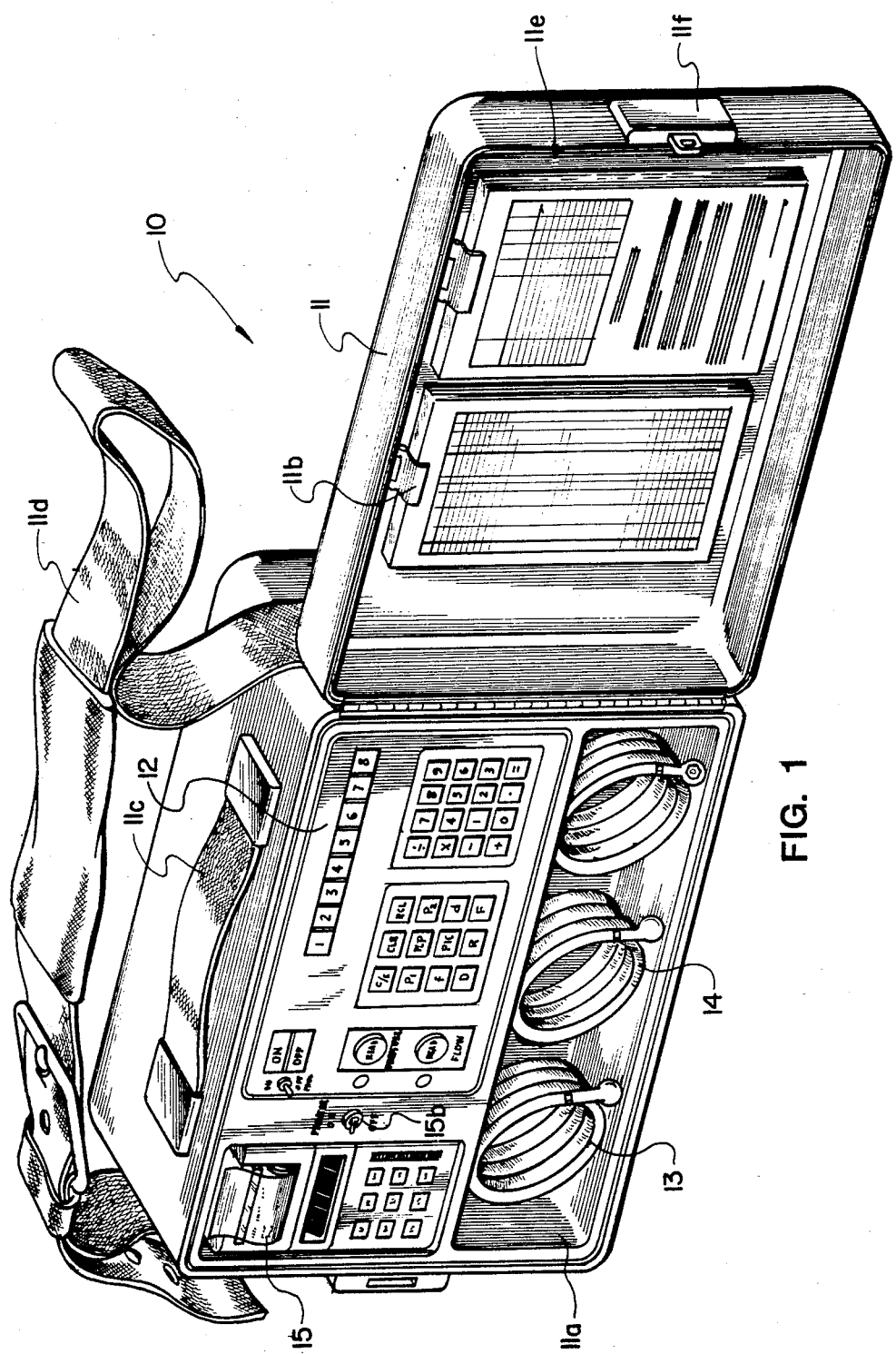
FIG. 1 is a perspective view of the preferred embodiment of the pressurized cable-sheath leak locating instrument.
Figure 2:
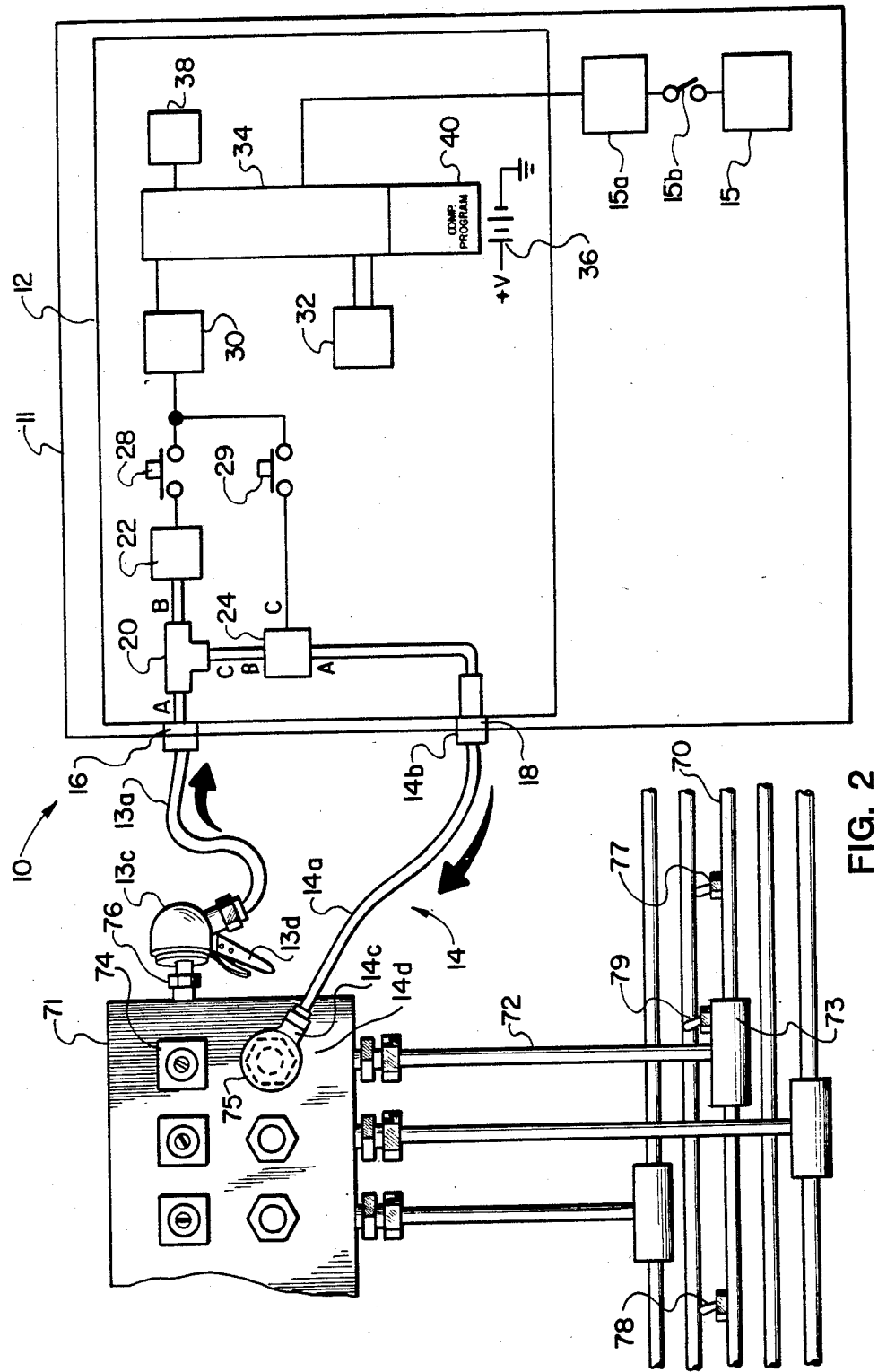
FIG. 2 is a schematic representation of the instrument shown connected to an airpipe manifold supplying air pressure to a communication cable being pressurized via both the manifold and a central office compressor-dehydrator.
Figure 3:
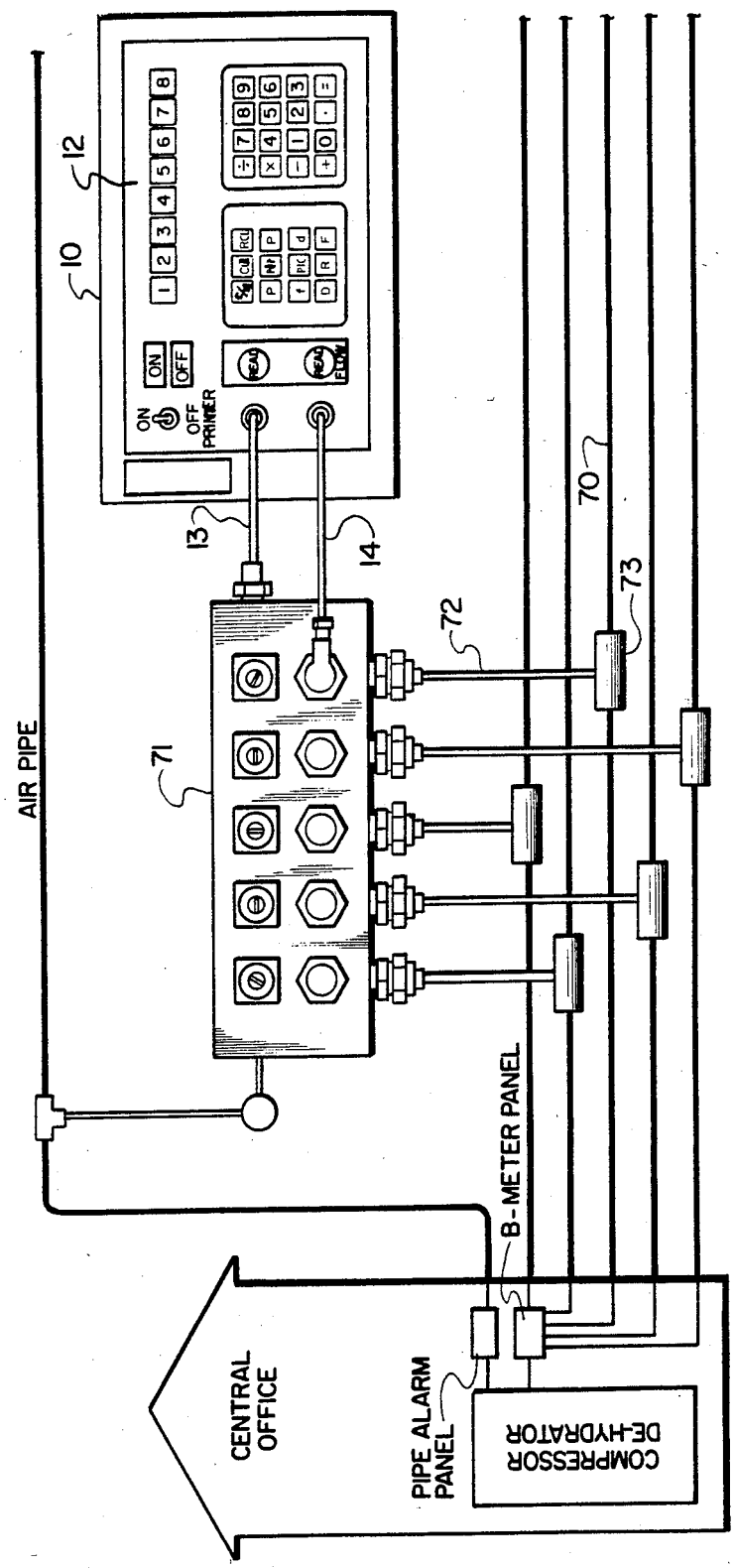
FIG. 3 is a schematic of the overall pressurization system showing the central office and the instrument connected to an airpipe manifold.

The best mode or preferred embodiment for carrying out the pressurized cable-sheath leak locating instrument 10 is pictorially illustrated in FIG. 1 and in block diagram form in FIG. 2. The instrument connected to the overall cable pressurization system is shown in FIG. 3.

As can best be seen in FIG. 1 the instrument is comprised of a protective carrying case 11 housing a pneumatic/electronic unit 12 and a hard-copy printer 15. The case 11 also includes a recessed area 11a where a pneumatic pressure hose assembly 13 and a pneumatic air-flow hose assembly 14 can be stored. On the inside of the lid are located a set of spring clips 11b that can be used to conveniently clip an area map of the cable under investigation and/or other test data. To facilitate carrying the case, a handle 11c and an adjustable shoulder strap 11d are attached to the top of the case. The lid also has a waterproof seal 11e that prevents moisture from entering the case when the lid is closed by means of the snap lock 11f.

Figure 4:
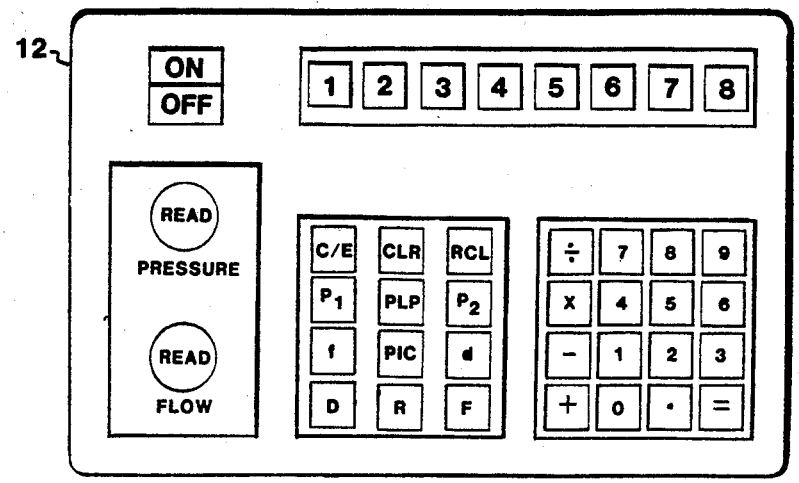
FIG. 4 is a front view of the pneumatic/electronics unit.

The pneumatic/electronic unit 12, as shown schematically in FIG. 2 and externally in FIG. 4 is comprised of thirteen major elements: a pneumatic pressure receptacle 16, a pneumatic flow receptacle 18, a three-port pneumatic connector 20, a pressure transducer 22, a flow transducer 24, a read pressure switch 28, a read flow switch 29, an analog-to-digital converter 30, a keyboard and keyboard logic 32, an electronics calculator 34, a digital display 38 and a computer program 40. Power for the instrument, in the preferred embodiment, is obtained from a nickel-cadmium battery 36 that may be recharged by means of an external charging circuit.

Referring to FIG. 2, the instrument 10 is shown connected to a cable sheath 70 by way of an airpipe manifold 71 supplying air through an air hose 72 into a cable splice case 73 enclosing the cable sheath 70. The sheath 70 is of the type that surrounds a plurality of communication conductors, such as those used by telephone/communication companies, and that is suspected of having an air leak.

The standard airpipe manifold 71 has five outputs, as shown in FIG. 3 where each output supplies air to an individual cable sheath 70. Each manifold is equipped with a manifold shut-off valve 74, a manifold/cable pressure valve 75, and a manifold pressure valve 76. On one side of the cable splice case 73 there is also located a first cable pressure test valve 77 and on the other side a second cable pressure test valve 78. On the splice case itself is located a splice-case pressure test valve 78. All the valves 75, 76, 77, 78 and 79 are of a type that are normally hermetically sealed and open only when an activating connector is attached such as the air chucks 13b and 14b on the pneumatic pressure and air-flow hose assemblies 13, 14 respectively.

The instrument 10 is used to measure the gas pressure and gas-flow rate in the cable sheath 70. Both of these measurements evolve into mathematical terms that are used in the computer program 40 in solving the following two equations where the first equation provides the maximum diatance of the air leak from the measuring point of the pressure source thus, limiting the area of search; and where the second equation determines the air flow between two points of a known cable distance.

$$D = \frac{1000\,P}{FR} \qquad (1)$$

where
D = maximum distance in feet (meter) of air leak from the pressure source measuring point.
P = pressure in psi (kPa) in cable at a given location.
F = gas-flow rate in SCFH (m$^3$/hr) in cable sheath.
R = pneumatic resistance per 1000 feet (300 meter) of a particular size and gauge of cable.

$$F = \frac{1000\,(P_1 - P_2)}{dr} \qquad (2)$$

where
F = gas-flow rate in SCFH (m$^3$/hr) in cable sheath.
$P_1$ and $P_2$ = pressure readings in psi (kPa) of two pressure points in the cable sheath separated by a known distance d.
d = distance in feet (meter) between cable sheath pressure testing valves.
R = pneumatic resistance per 1000 feet (300 meter) of a particular size and gauge of cable.

Figure 5:
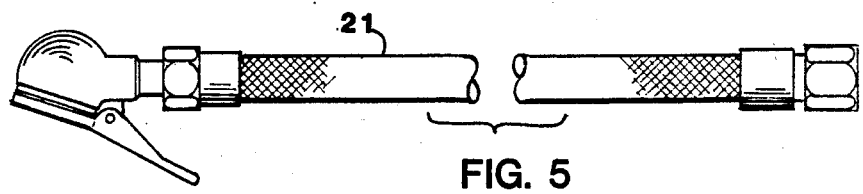
FIG. 5 is a side view of a pneumatic hose encased in an armored sheath.

To measure the air pressure and/or air flow rate in the sheath 70 the instrument 10, as best shown in FIG. 2, is interfaced with the airpipe manifold 71 by means of the pneumatic pressure hose assemblies 13 and 14. These assemblies are normally constructed of a nonporous plastic or rubber material. However, when the hoses are expected to be exposed to abnormal wear they may be encased in a flexible armored sheath 21 as shown in FIG. 5. To measure the air pressure at the airpipe manifold 71, the first pneumatic pressure connector 13b is connected to the external end of the pneumatic pressure receptacle 16 and the second pneumatic pressure receptacle 13c is connected to the manifold pressure valve 76.

To measure the flow-rate the cable assembly 13 remains connected. The first pneumatic flow connector 14b is then connected to the external end of the pneumatic air low receptacle 18 and the second pneumatic flow connector 14c is connected to the selected manifold/cable pressure valve 75. The connector 13c, 14c, in the preferred embodiment, are quick disconnect air chucks having a release level 13d, 14d as also best shown in FIG. 2.

The pressure receptacle 16 and air flow receptacle 18, both of which are located on an enclosure 42 housing the instrument 10, are of the type that are normally hermetically sealed until the first pneumatic pressure connector 13b and the first pneumatic flow connector 14b are attached at which time, the hermetic seal is temporarily broken allowing the air to flow into the instrument 10.

The internal end of the pneumatic pressure receptacle 16, that is the end within the pneumatic/electronics unit 12, is connected to the first port (A) of the three-port pneumatic connector 20. The second port (B) of the connector 20 is connected to the input side of the pressure transducer 22. The pressure transducer in the preferred embodiment is of the strain gauge type although other technology types may be used. The governing factor to consider in the type used is the transducers capability to operate in the range of 0 to 10 pounds per square inch (psi) (0 to 69 kPa). It is also preferred that the transducer perform and output in one-tenth psi and equivalent metric increments. The pressure transducer 22 converts the gas pressure to a d-c voltage that is proprotional to the gas pressure. The d-c voltage is applied to an electric pressure switch 28 that consists of a momentary-on single-pole, single-throw push button switch. When the switch 28, which is located on the pneumatic/electronic unit 12, is pressed, the electrical output of the pressure transducer 22 is applied to the input of the analog-to-digital converter (ADC) 30. The function of the ADC and subsequent circuits are described following a discussion of the flow rate measurement.

To measure the air flow rate being communicated through the interior of the airpipe manifold 71, the air flow is diverted through a pneumatic loop comprised of the pneumatic air-flow hose assembly 13, ports A and C of the three-port pneumatic connector 20, the flow transducer 24, and the pneumatic pressure hose assembly 14. Note that to measure the gas flow rate both of the hose assemblies 13, 14 are connected in place. The hose assembly 14 is connected to the airpipe manifold 71 by attaching a first pneumatic flow connector 14b to the external end of the pneumatic flow receptacle 18. The flow receptacle is also located on the pneumatic/electronics unit 12 and is also of the type that allows flow only after the second pneumatic flow connector 14b is attached. The other end of the assembly 14 has the second pneumatic flow connector 14c which is also a quick disconnect air chuck. This connector is attached to one of the manifold/cable pressure testing valves 75 to complete the pneumatic loop.

The internal end of the pneumatic flow receptacle 18 is connected, as shown in FIG. 2, to the pneumatic output (A) of the air flow transducer 24. The pneumatic input (B) is applied through ports A and C of the three-port pneumatic connector 20 and through the pressure hose assembly 12 to complete the gas flow loop from the manifold pressure testing valve. The flow transducer in the preferred embodiment is of the turbine or paddle wheel type although other technology types may be used. The governing factor to consider in the type used is the transducers capability to operate in the range of 0–20 standard cu ft/hours (SCFH) (0–0.57 m$^3$/hr) and to be directional so that the direction of flow between two points can be determined. An alternate method that may be used to determine the directional air flow is to attach a check valve (not shown) between the pneumatic output (A) of the flow transducer 24 and the internal end of the pneumatic air flow receptacle 18.

The flow transducer 24 converts the air flow rate to a d-c voltage that is proportional to the air flow rate. The d-c voltage is then applied to an electrical flow switch 29 that consists of a momentary-on single-pole single-throw push-button switch. The flow switch 29 is also located on the pneumatic/electronics unit 12 near the pressure switch 28. When the flow switch is depressed the electrical output (C) of the flow transducer 24 is applied to the input of the ADC 30.

The ADC 30 is used to convert the analog d-c voltages, supplied from either the pressure transducer 22 or the flow transducer 24, into equivalent digital signals. The ADC digital signals as well as signals from the keyboard and keyboard logic 32 are supplied to the electronics calculator 34.

Figure 6:
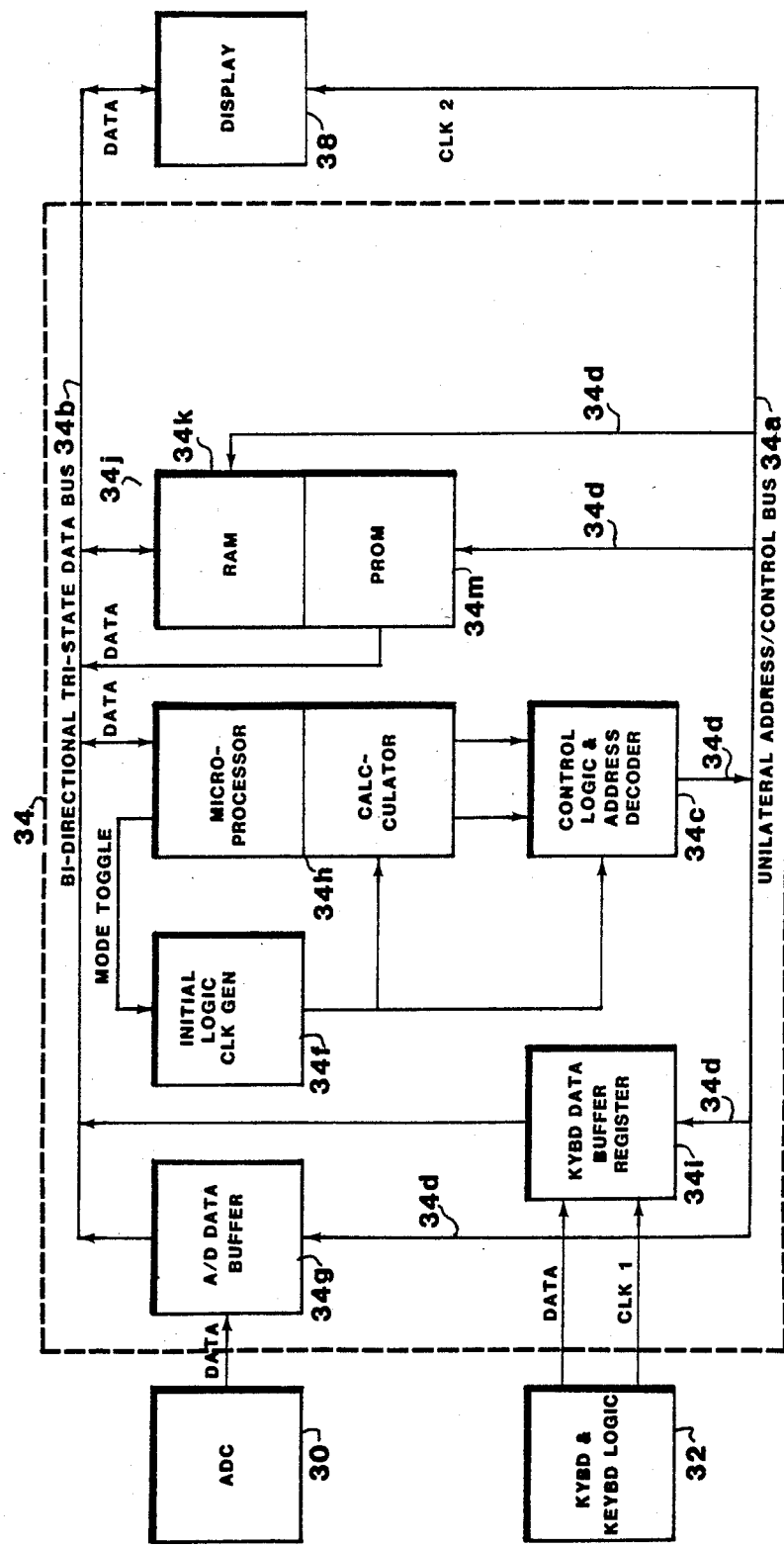
FIG. 6 is a block diagram of the instrument electronics calculator and interfacing devices.

The electronics calculator as shown in FIG. 6, is comprised of a plurality of logic/digital circuits, computer program storage and retrieval circuits and a computer program 40. The circuits are further comprised of twelve major elements: a unilateral address/control bus 34a; a bi-directional tri-state data bus 34b; a control logic and address decoder 34c; a series of hex encoded enable and read/write lines 34d; an initialization logic and clock generator 34f; a three-state A/D data buffer 34g; a microprocessor/calculator 34h, a three-state keyboard data buffer register 34i; and a contiguous calculator memory 34g consisting of a random access memory (RAM) 34k and a programmable read only memory (PROM) 34m.

The unilateral address/control bus 34a is depicted in FIG. 6 as a harness containing the hex encoded enable and read/write lines 34d that are connected to the various logic/digital circuits. The enable lines together with the read/write lines decide which of the devices connected to the bus 34a are involved in the data transfer and the direction of data flow from the devices. The bus originates from the control logic and address decoder 34c. This device, which is essentially comprised of a demultiplexer followed by a latch, is used to expand the hex encoded enable lines and read/write lines 34d and to buffer the initialization logic signals and clock generator.

The bi-directional tri-state data bus 34b contains the appropriate data entering or leaving the devices connected to the bus. The remainder of the device outputs, that are not currently enabled to send or receive through the data bus, are placed into a high-impedance state; thus, effectively isolating them from the current listener (device receiving data) and talker (device sending data) on the data bus 34b.

As previously mentioned the ADC 30 is used to read both the pressure transducer 22 and flow transducer 34 outputs. An analog switch within the ADC selects either output for conversion. The converted output is applied to and latched by the three-state A/D buffer 34g; this methodology allows an asynchronous operation of the ADC. Thus, freeing the microprocessor 34h of other priority functions until it can service the ADC data acquisition request.

The keyboard and keyboard logic 32 outputs consisting of the keyboard data and keyboard strobe signal are also latched by the three-state keyboard data buffer register 34i. These outputs are later retrieved by the microprocessor 34h as required. The keyboard 32, as best shown in FIG. 4, has special keys to minimize operation strokes. The keyboard can also be color coded to further facilitate data entry. The keyboard and the key functions are described in the operation section infra.

The calculator memory 34j is designed, in the preferred embodiment, as a contiguous memory comprising a random access memory (RAM) 34k and a programmable read only memory (PROM) 34m. A read only memory (ROM) may be substituted for the PROM.

The RAM 34k contains the variable registers and other buffer registers that the microprocessor 34h might require. The RAM is also non-volatile. Thus, when power to the instrument 10 is turned-off the data in the memory is not lost. Loss of data can only occur when the battery 36 is defective or when the battery voltage is below the normal operating level.

The final calculator device described is the PROM 34m. This PROM contains the monitor routines necessary for the calculator 34 to perform its intended functions. Shortly following turn-on of the calculator, the microprocessor/calculator 34h addresses the PROM for the initialization routines after which the monitor routines within the PROM maintain control of the microprocessor.

The output of the calculator 34 is applied to the digital display 38. The display may have a single or multiple line digital display. In the multiple line display several inputs and/or outputs can be viewed simultaneously. The display is comprised of latches, the decoder logic for the display elements and the digital display elements themselves. Any data stored in the latches is displayed simultaneously. The latches may be designed to contain BCD or seven-segment format data. In the preferred embodiment the conversion from binary to either format is accomplished via software routines in lieu of hardware. Thus, parts count and power consumption is maintained at a low level.

The output of the calculator in the preferred embodiment is also applied to a printer signal conditioning circuit 15a that is connected to the hard copy printer 15 via a toggle switch 15b. The printer sequentially lists the input and/or output data required to determine the location of the leak. The printer may be either of the thermal type or of the rotary wheel variety with the thermal type preferred. Note that the printer is not necessary to accomplish the function of the instrument.

The electronics calculator 34 operates by means of a computer program 40 comprised of a series of instructions that guide the microprocessor 34h in performing the various functions of the instrument 10. The program is encoded in the PROM 34m as binary words and in a machine language native to the microprocessor. The algorithms for these instructions are illustrated in the computer program flow diagrams included in FIGS. 7(1)–7(11).

The instructions are translated from prose to the microprocessor binary worded machine language. In the preferred embodiment the translation is permanently written into the PROM 34m by means of a PROM programmer. The PROM width (the number of binary bits per word location) corresponds to the applicable width of the microprocessor 34h. As an alternative mechanization scheme several PROMS in parallel may be used in lieu of one higher capacity PROM. In this case the program word is split into incremental bits equal to or less than the PROM width and written into PROMS in parallel so that the same addresses on the multiple PROMS yield a composite program word at their data outputs.

The addressing of the PROM 34m is similar to that of the RAM 34k with the exception that the PROM can only be read from. When the PROM is addressed, the program words appear as data on the bi-directional tri-state data bus 34b; the microprocessor has a mechanism that differentiates the data from the bus as either data or as instructions.

To facilitate faster execution of instructions, a memory-mapped scheme is considered the best mode for carrying out the invention. Memory-mapping is achieved by using part of the microprocessor's memory address space for device address and control. (For example, if address 2048 is reserved for the flag register circuit, a write to location 2048 would be equivalent to setting the flag register bits and a read from location 2048 would be equivalent to reading the state of the flag register bits). Not only would "function execution" be fast, but also device control is greatly simplified. While using part of the microprocessor's address space for device addressing and control seems to "waste" otherwise usable memory space, the amount of memory (both Random Access Memory and Programmable Read Only Memory) required is very small compared to typical address areas of microprocessors (usually at least 65536 bytes).

Typically, a memory map for the pressurized cable calculator would appear as:

| Device | Address(HEX) | Remark/s |
| --- | --- | --- |
| Read Only Memory | 0000–8191 | Program Area |
| Flag Register | 8192–8192 | "Scratchpad" memory |
| Random Access Mem | 8193–24575 | Part of RAM |
| Keyboard Buffer | 65488–65503 | Read only |
| ADC Buffer | 65504–65519 | Read Only |
| Display | 65520–65535 | Write only |

The address assignments are arbitrary, except for the starting location of Read Only Memory in some implementations because of the Reset Vector address of some microprocessors. (Reset Vectors are locations in memory where a microprocessor starts executing instructions following turn-on or reset of the calculator). The amount of space allocated for each device is also arbitrary and is not necessarily exhausted by the devices; these are only areas reserved for those devices so as to allow for expansion and/or modification of the calculator features. Details on the usage of the devices for address areas are explained later in the firmware section.

There are many ways to mechanize the invention in terms of microprocessors. An optimized approach, yet expensive, is to use semicustomized or customized integrated circuits. The advantage of this approach is that the instruction set (or program) can be built into the integrated circuit, thus, the calculator would execute functions faster and the program area can be kept minimal (since unnecessary operation codes can be eliminated). Another advantage to this approach is that the total number of integrated circuits can be minimized, therefore, allowing lesser power dissipation from the batteries and a higher calculator reliability.

An alternative approach utilizes off-the-shelf microprocessors suitable for use as industrial controllers. Prime examples are Zilog's Z80 and Z8 microprocessors. The Z80 Central Processor Unit (CPU) has been an accepted industry controller CPU for its relatively powerful instruction set, availability of fast clocked versions (up to 8 MegaHertz) and single power supply requirements. The Z8 CPU is yet a better industrial controller CPU since a PROM area is already provided and its inherent design philosphy favors controller/-stand-alone applications. The instruction set of the Z8 CPU is similar to that of the Z80 CPU. The Z8 also uses a single power supply.

FIRMWARE

The actual program that is stored in the calculator to perform the functions of the invention is referred to as the firmware. Firmware is distinguished from software in that firmware implements the "personality" of the calculator because it is always part of the calculator (within the Read Only Memory); unlike software which can be "loaded" and "unloaded" from the calculator without replacing or altering the electronic circuitry.

The main program as well as the subroutines required by the main program such as the arithmetic, RAM manipulation data acquisition (from the ADC), and Flow Rate and Distance from leak functions constitute the firmware in this invention.

Before presenting the computer sequence of events or program, labels for the device addresses are needed. Following is a table of device address labels assigned to memory area locations of the various devices (keeping in mind that since the memory-mapped scheme is being used, device addressing is accomplished by treating devices as if they were memory locations).

| Label | Device | Remarks |
|-------|--------|---------|
| Flag: | Flag Register | This is a byte containing the four bits (STO, RCL, FUNC & CONV) describing the state of the calculator. |
| RAMx: | RAM | "x" is the offset from the beginning of Random Access Memory area in bytes. |
| KBD: | Keyboard Buffer | This is, basically, a buffer containing the most recent keyboard strokes not yet processed by the program. |
| ATD: | A/D Conv Buffer | The buffer containing the latest readings from the pressure and flow transducers. |
| DSP: | Display | The address of the display device; writing to this address causes the display of data on the display device. |

Addressing and controlling the devices with the calculator are accomplished by simply reading and/or writing to their respective address space locations. For example, to determine the flag bit states, a read from FLAG: is performed. Special notes should be taken, however, on the keyboard, A/D converter and display buffers. The keyboard buffer contains a special bit called a "KBD PRESSED" bit which is set when a key is pressed and reset when the buffer is read from. The A/D buffer consists of two locations (called ATD0: and ATD1:) one for pressure (ATD0:) and another for flow rate (ATD1:). The scheme for writing to the display buffer is such that seven bytes are sent one after the other from the CPU. Each byte is encoded in Binary Coded Decimal. As each byte is received from the CPU, the BCD digits are serially shifted into the display buffer for display after the last byte arrives. The last byte is followed by a unique terminator byte (in this implementation, we will set the terminator byte to "F"). The terminator byte is a signal to the display buffer that before displaying the next digit written to it, the display should be cleared first. Random Access Memory (RAM)

The use of RAM in the calculator is strictly for data storage purposes. This is the area where the flag register is implemented, the temporary results stored and the variables entered. Some labelling of the RAM areas is also appropriate before the calculator sequence of events is presented:

| Label | Remarks |
|-------|---------|
| TEMP: | Temporary accumulator for calculations |
| TEMP1: | Second temporary accumulator |
| FINAL: | Final result accumulator |
| P1: | Pressure reading from pressure x'ducer #1 |
| P2: | Pressure reading from pressure x'ducer #2 |
| D: | Distance register |
| R: | Pneumatic resistance/1000' |
| F: | Flow rate reading from flow rate x'ducer |
| OP: | Pending arithmetic operation |
| REG1: - REG10: | Regular storage registers |
| DSP1: - DSP13: | BCD version of Final: (not automatically updated) |

The register (Reg 1: to Reg 10:), Temp: and Final: locations may be composed of several physical memory locations depending on the chosen representation—whether a floating point or cardinal format is elected.

CALCULATOR SEQUENCE OF EVENTS

A. INITIALIZATION
1. Write "00" to FLAG:
2. Write "F" to DSP:
3. Write "0" to DSP:
4. Write "F" to DSP:
5. Write "0" to TEMP:
6. Write "0" to FINAL:

B. WAIT-KEY LOOP
1. Read KBD: into CPU Accumulator (hereinafter referred to as ACC)
2. If "KBD PRESSED" bit is set
   then jump to step C.
   else jump to step B.

C. DECODE
1. Test ACC against keyboard codes
2. If "Clr" then go to step D.
3. If "C/A" then go to step E.
4. If digit ("0" to "9") then go to step F.
5. If "STO" then go to step G.
6. If "RCL" then go to step H.
7. If "P1" then go to step I.
8. If "P2" then go to step J.
9. If "F" then go to step K.
10. If "R" then go to step L.

11. If "D" then go to step M.
12. If "RP" then go to step N.
13. If "RF" then go to step O.
14. If "+" then go to step U.
15. If "−" then go to step V.
16. If "*" then go to step W.
17. If "/" then go to step X.
18. If "=" then go to step Y.

D. CLEAR DISPLAY
 1. Write "F" to DSP:
 2. Write "0" to DSP:
 3. Write "F" to DSP:
 4. Write "0" to FINAL:
 5. Go to step B.

E. CLEAR ALL (Reset)
 1. Write "0" to FLAG:
 2. Go to step D.

F. PROCESS DIGIT
 1. Read FLAG: into ACC
 2. If STO bit set then go to step Q.
 3. If RCL bit set then go to step R.
 4. If STO and RCL bits not set then go to step P.

G. STORE
 1. Read FLAG: into ACC
 2. Set STO bit
 3. Write ACC to FLAG:
 4. Go to step B.

H. RECALL
 1. Read FLAG: into ACC
 2. Set RCL bit
 3. Write ACC to FLAG:
 4. Go to step B.

I. P1
 1. Read FLAG: into ACC
 2. If STO bit set then write TEMP: to P1:
 3. If RCL bit set then write P1: to FINAL and TEMP:
 4. Convert FINAL: to BCD and write result in DSP1: through DSP13:
 5. Write DSP1: through DSP13: to DSP:
 6. Reset STO bit
 7. Reset RCL bit
 8. Write ACC into FLAG:
 9. Write "0" to FINAL:
 10. Go to step B.

J. P2
 1. Read FLAG: into ACC
 2. If STO bit set then write TEMP: to P2:
 3. If RCL bit set then write P2: to FINAL and TEMP:
 4. Convert FINAL: to BCD and write result in DSP1: through DSP13:
 5. Write DSP1: through DSP13: to DSP:
 6. Reset STO bit
 7. Reset RCL bit
 8. Write ACC into FLAG:
 9. Write "0" to FINAL:
 10. Go to step B.

K. F/Calc
 1. Read FLAG: into ACC
 2. If STO bit set then write TEMP: to F:
 3. If RCL bit set then write F: to FINAL: and TEMP:
 4. If STO and RCL bits not set then go to step S.
 5. Convert FINAL: to BCD and write result in DSP1: through DSP13:
 6. Write DSP1: through DSP13: to DSP:
 7. Reset STO bit
 8. Reset RCL bit
 9. Write ACC into FLAG:
 10. Write "0" to FINAL:
 11. Go to step B.

L. R
 1. Read FLAG: into ACC
 2. If STO bit set then write TEMP: to R:
 3. If RCL bit set then write R: to FINAL: and TEMP:
 4. Convert FINAL: to BCD and write result in DSP1: through DSP13:
 5. Write DSP1: through DSP13: to DSP:
 6. Reset STO bit
 7. Reset RCL bit
 8. Write ACC into FLAG:
 9. Write "0" to FINAL:
 10. Go to step B.

M. D/Calc
 1. Read FLAG: into ACC
 2. If STO bit set then write TEMP: to D:
 3. If RCL bit set then write D: to FINAL and TEMP:
 4. If STO and RCL bits not set then go to step T.
 5. Convert FINAL: to BCD and write result in DSP1: through DSP13:
 6. Write DSP1: through DSP13: to DSP:
 7. Reset STO bit
 8. Reset RCL bit
 9. Write ACC into FLAG:
 10. Write "0" to FINAL:
 11. Go to step B.

N. RP
 1. Read ATD0: into FINAL:
 2. Read FINAL: into TEMP:
 3. Convert FINAL: to BCD and write result in DSP1: through DSP13:
 4. Write DSP1: through DSP13: to DSP:
 5. Write "0" to FINAL:
 6. Go to step B.

O. RF
 1. Read ATD1: into FINAL:
 2. Read FINAL: into TEMP:
 3. Convert FINAL: to BCD and write result in DSP1: through DSP13:
 4. Write DSP1: through DSP13: to DSP:
 5. Write "0" to FINAL:
 6. Go to step B.

P. Digit
 1. Multiply FINAL: by "10" and store result in FINAL:
 2. Add digit to FINAL: and store result in FINAL:
 3. Convert FINAL: to BCD and write result in DSP1: through DSP13:
 4. Write DSP1: through DSP13: to DSP:
 5. Write FINAL: to TEMP:
 6. Go to step B.

Q. STORE TO REGISTER
 1. Write TEMP: to location REGd: (d=Digit)
 2. Write "0" to FINAL:
 3. Go to step B.

R. RECALL FROM REGISTER
 1. Read from location REGd: (d=Digit) to FINAL:
 2. Convert FINAL: to BCD and write result in DSP1: through DSP13:
 3. Write DSP1: through DSP13: to DSP:
 4. Write FINAL: to TEMP:
 5. Write "0" to FINAL
 6. Go to step B:

S. SOLVE FOR FLOW RATE

1. Write "0" to FLAG:
2. Read from P1: to TEMP:
3. Read from P2: to FINAL:
4. Subtract FINAL: from TEMP: and store result in TEMP:
5. Multiply TEMP: by "1000" and store result in TEMP:
6. Read from D: to FINAL:
7. Divide TEMP: by FINAL: and store result in TEMP:
8. Read from R: to FINAL:
9. Divide TEMP: by FINAL: and store result in TEMP:
10. Read TEMP: into FINAL:
11. Convert FINAL: to BCD and write result in DSP1: through DSP13:
12. Write DSP1: through DSP13: to DSP:
13. Write "0" to FINAL:
14. Go to step B.

T. SOLVE FOR DISTANCE TO LEAK
1. Write "0" to FLAG:
2. Read from P1: to TEMP:
3. Multiply TEMP: by "1000" and store result in TEMP:
4. Read from F: to FINAL:
5. Divide TEMP: by FINAL: and store result in TEMP:
6. Read from R: to FINAL:
7. Divide TEMP: by FINAL: and store result in TEMP:
8. Read TEMP: into FINAL:
9. Convert FINAL: to BCD and write result to DSP1: through DSP13:
10. Write DSP1: through DSP13: to DSP:
11. Write "0" to FINAL:
12. Go to step B.

U. + Key
1. Read FLAG: into ACC
2. If FUNC bit set then
   Read OP: into ACC
   Decode ACC for operation
   Perform operation between TEMP: and TEMP1: and store result in TEMP1:
   Write TEMP1: into FINAL:
   Write TEMP1: to TEMP:
   Convert FINAL: to BCD and write result in DSP1: through DSP13:
   Write DSP1: through DSP13: to DSP:
   Write "0" to FINAL:
3. If FUNC bit not set then Write TEMP: into TEMP1:
4. Write "0" to ACC
5. Set FUNC bit
6. Write ACC to FLAG:
7. Write code for "+" in OP:
8. Go to step B.

V. − Key
1. Read FLAG: into ACC
2. If FUNC bit set then
   Read OP: into ACC
   Decode ACC for operation
   Perform operation between TEMP: and TEMP1: and store result in TEMP1:
   Write TEMP1: into FINAL:
   Write TEMP1: to TEMP:
   Convert FINAL: to BCD and write result in DSP1: through DSP13:
   Write DSP1: through DSP13: to DSP:
   Write "0" to FINAL:
3. If FUNC bit not set then
   Write TEMP: into TEMP1:
4. Write "0" to ACC
5. Set FUNC bit
6. Write ACC to FLAG:
7. Write code for "−" in OP:
8. Go to step B.

W. * Key
1. Read FLAG: into ACC
2. If FUNC bit set then
   Read OP: into ACC
   Decode ACC for operation
   Perform operation between TEMP: and TEMP1: and store result in TEMP1:
   Write TEMP1: into FINAL:
   Write TEMP1: to TEMP:
   Convert FINAL: to BCD and write result in DSP1: through DSP13:
   Write DSP1: through DSP13: to DSP:
   Write "0" to FINAL:
3. If FUNC bit not set then
   Write TEMP: into TEMP1:
4. Write "0" to ACC
5. Set FUNC bit
6. Write ACC to FLAG:
7. Write code for "*" in OP:
8. Go to step B.

X. / Key
1. Read FLAG: into ACC
2. If FUNC bit set then
   Read OP: into ACC
   Decode ACC for operation
   Perform operation between TEMP: and TEMP1: and store result in TEMP1:
   Write TEMP1: into FINAL:
   Write TEMP1: to TEMP:
   Convert FINAL: to BCD and write result in DSP1: through DSP13:
   Write DSP1: through DSP13: to DSP:
   Write "0" to FINAL:
3. If FUNC bit not set then
Write TEMP: into TEMP1:
4. Write "0" to ACC
5. Set FUNC bit
6. Write ACC to FLAG:
7. Write code "/" in OP:
8. Go to step B.

Y. = Key
1. Read FLAG: to ACC
2. If FUNC bit not set then go to step B.
3. Write "0" to FLAG:
4. Read OP: into ACC
5. Decode ACC for operation
6. Perform operation between TEMP: and TEMP1: and store result in TEMP:
7. Read TEMP: into FINAL:
8. Write "0" to TEMP1:
9. Convert FINAL: to BCD and write result in DSP1: through DSP13:
10. Write DSP1: through DSP13: to DSP:
11. Write "0" to FINAL:
12. Go to step B.

OPERATION OF INSTRUMENT

The operation of the instrument 10 is described in a series of functional steps commencing from the time an air leak is detected at the central office and concluding when the leak point is located and repaired. All keys and switches mentioned in the discussion are located on the front panel of the instrument.

1. When an abnormal air usage is detected at the central office, a maintenance technician together with the monitoring printouts is dispatched to the location of the airpipe manifolds feeding the cable system with the suspected leak.

2. Before testing commences at the airpipe manifolds it is necessary that the pneumatic pressure of the specific cable under investigation be keyed-in and stored in the memory circuit of the instrument 10. To determine this resistance the maintenance technician keys into the instrument the number of wire pairs in the cable, a decimal point and the gauge of the wire. For example, the numbers 1200.24 would represent a cable having 1200 pairs of 24 gauge conductors. By pressing the "PULP" or "PIC" keys, which denote the cable type, the instrument 10 will take the permanently stored pneumatic resistance out of its memory registers for that particular cable type and display it on the digital display 38. The "R" key is then pressed to enter the resistance value into the calculator registers for use in the equation solution. All data entered into the instrument 10 to solve either of the two equations 1 or 2 will be placed into the storage registers and may be recalled for verification by pressing the "RCL" key and the appropriate input key. Any one input may be altered without changing the others. The flow rate or distance can be recalculated using stored data at any time by pressing the special "F" or "D" keys.

The calculator also includes the standard four functions (+, −, ×, ÷) for convenience and the resultant calculations displayed can be stored in the instrument 10 for any pressure, flow, distance or pneumatic resistance of a cable. By pressing the "CE" key the display may be cleared without affecting pending operations; the "CLR" key clears the display for pending operations.

3. At the manhole, as shown in FIG. 2, the instrument is connected to the airpipe manifold 71 by attaching the first pneumatic pressure connector 13c to the manifold pressure valve 76.

To read the manifold pressure, the READ PRESSURE key is pressed and the pressure is viewed on the digital display 38 and/or the printer 39—both the digital display and printer are hereinafter referred to as "display". If the technician decides that this pressure is to be used for either or both the "maximum distance" and/or a "flow" calculation, the "P1" key is pressed which causes the pressure data to be stored in the instrument memory circuit for future use. The flow rate through the suspected cable is obtained by attaching connector 14c to the manifold/cable pressure valve 75 and closing the corresponding manifold shut-off valve 74. Thus, allowing air to flow through the pneumatic circuit of the instrument 10 as shown in FIG. 2. To read the flow the "READ FLOW" key is pressed and the flow rate is viewed on the display. To store the data in the calculator memory circuit the "F" key is pressed.

The pneumatic resistance of the cable is then determined and keyed into the calculator as described in step 2. To solve equation (1) $D=(P/FR)$ the "D" key is pressed and the maximum distance (D) to the air leak is viewed on the display. The instrument is removed and the manifold shut-off valve 74 is opened.

4. The direction of flow is determined by attaching the connector 13c to the splice-case pressure test valve 79 and connector 14c to the first cable pressure test valve 77 located on the cable splice case 73. The "READ FLOW" key is then pressed. If there is a flow, the flow will be shown on the display indicating a flow in the direction of the first cable pressure test valve 77. If no flow is indicated move the connector 14c to the second cable pressure test valve 78 and once again press the "READ FLOW" key and observe a pressure reading on the display. After the direction of flow is determined disconnect the instrument and proceed to the adjacent distribution manhole as determined by the direction of the flow and the area cable maps.

5. At the distribution manhole 80, as shown in FIG. 8, all stub cables 81 (only one is shown for clarity) and all the lateral cables 82, 83, 84 branching off the feeder cable 70 are tested for air flow in the same manner as described in steps 3 and 4. Initially connector 13c is connected to the first distributing splice-case pressure test valve 86 located on the first distribution splice-case 85 and connector 14c to the second distributing splice-case pressure test valve 88 on the second distribution splice-case 87. The "READ FLOW" key is then pressed and the flow direction and flow rate will be indicated on the display. If a flow is indicated the instrument is disconnected.

Connector 13c is then connected to the second distribution splice-case pressure test valve 88 and the "READ PRESSURE" key is pressed. The pressure will be indicated on the display. The "P1" key is next depressed causing the pressure reading to be stored in the memory circuits of the instrument for future use. The instrument is once again disconnected and the technician proceeds to test the pressure in each of the lateral cables 82, 83, 84. This is accomplished by sequentially connecting connector 13c to each of the respective lateral cable pressure test valves 89, 90, 91. When a pressure drop is detected in one of the pressure test valves, for example, test valve 89, the "P2" key is pressed to allow the indicated pressure to be stored in the calculator memory. The instrument is once again disconnected.

The technician next presses key "P1" to recall the pressure reading taken at the second distribution splice-case pressure test valve 88 and in sequence key "P2" is pressed to recall the reading at test valve 89. By referring to the area cable maps, the type of cable and the distance between the two test valves 81, 89 can be determined. The distance is keyed into the calculator by pressing the "d" key and the cable resistance data is keyed in by pressing the "R" key as described in step 2. The F key is then pressed to solve equation (2)

$$F = \frac{1000 \, (P_1 - P_2)}{dR}$$

and the "f" key is pressed to store the solved flow data in the memory circuit of the instrument.

6. By using the stored data, equation 1 can again be solved to find the maximum distance to the air leak. Once the equation is solved the technician follows standard procedure to locate and repair the leak.

Figure 9:
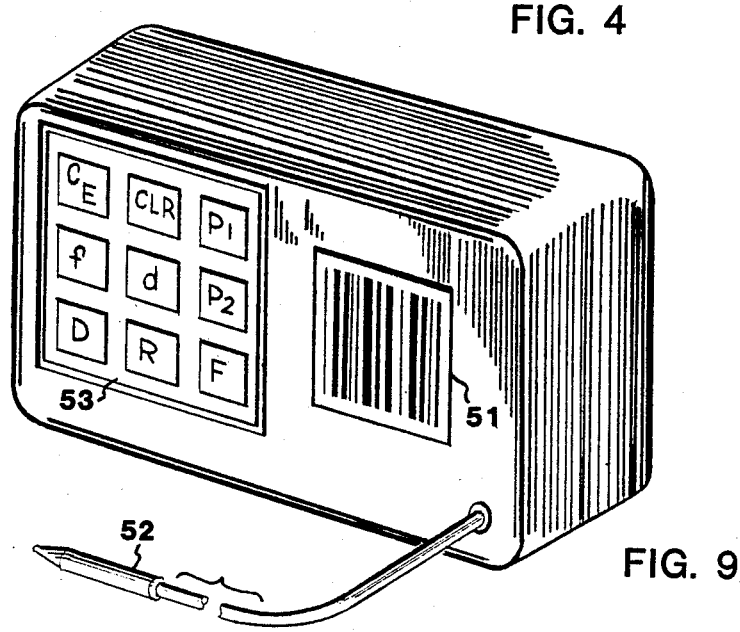
FIG. 9 is an isometric view of the second embodiment of the instrument.

A second embodiment of the instrument 10, differs in the method used to enter data into the electronics calculator 34. In this embodiment as shown in FIG. 9, a combination consisting of a bar code 51 and an optical wand 52 is used to enter the computational data. The keyboard 53 is also modified to be compatible with the data that is to be entered by the optical wand.

In its preferred configuration the instrument 10 is a portable device operating under battery power. However, the instrument may also be used in a central office where it would be operated from standard power lines with a suitable power pack. Under central office use the pneumatic hoses 12, 14 could be connected directly to a manifold in a permanent installation. Pressure inputs or flows from several cables could be switched into the instrument by means of electro-magnetically controlled valves in the manifold. Pressure and flow in several cables could thereby be monitored at the central office using the instrument in a fixed installation.

Although the invention has been described in complete detail and pictorally shown in the accompanying drawings, it is not to be limited to such details since many changes and modifications may be made to the Pressurized Cable-Sheath Leak Locating Instrument without departing from the spirit and scope thereof. Hence, the invention is described to cover any and all modifications and forms which may come within the language and scope of the claims.

We claim:

1. A pressurized cable-sheath leak locating instrument comprising:
   (a) an air pressurized cable-sheath surrounding a plurality of communication conductors,
   (b) means for determining the air pressure in the interior of said pressurized sheath and converting the air pressure to a d-c voltage that is proportional to the air pressure,
   (c) means for determining the air flow rate being communicated through the interior of said pressurized sheath and converting the flow rate to a d-c voltage that is proportional to the air flow rate,
   (d) means for converting the air pressure and air flow rate d-c voltages to equivalent digital signals, and
   (e) an electronics calculator that uses said digital signals in combination with mathemactical constants to solve the following set of equations that when solved provide distance and air flow data respectively that is used to limit the area of search of an air leak in said pressurized cable-sheath:

$$D = \frac{1000 \, P}{FR}$$

where
D = maximum distance in feet (meter) of air leak from the pressure source measuring point,
P = pressure in psi (kPa) in cable at a given location,
F = gas-flow rate in SCFH (m³/hr) in cable sheath,
R = pneumatic resistance per 1000 feet (300 meter) of a particular size and gauge of cable, $$F = \frac{1000 \, (P_1 - P_2)}{dr}$$

where
F = gas-flow rate in SCFH (m³/hr) in cable sheath, $P_1$ and $P_2$ = pressure readings in psi (kPa) of two pressure points in the cable sheath separated by a known distance d,
d = distance in feet (meter) between cable sheath pressure testing valves,
R = pneumatic resistance per 1000 feet (300 meter) of a particular size and gauge of cable.

2. The instrument as specified in claim 1 wherein said means for determining the air pressure in said pressurized cable sheath and converting the air pressure to the d-c voltage is accomplished by a pressure transducer.

3. The instrument as specified in claim 1 wherein said means for determining the air flow rate in said pressurized cable sheath and converting the air flow rate to the d-c voltage is accomplished by a flow transducer.

4. The instrument as specified in claim 1 wherein said means for converting the air pressure and air flow rate to equivalent digital signals is accomplished by an analog-to-digital converter.

5. A pressurized cable-sheath leak locating instrument comprising:
   (a) an air pressurized cable-sheath surrounding a plurality of communication conductors where said cable-sheath is pressurized by means of a compressor-dehydrater that supplies the air to said cable-sheath by way of an airpipe manifold connected to an air hose that in turn is connected to a cable splice case enclosing said cable sheath where said airpipe manifold has attached a manifold pressure valve and a cable pressure valve,
   (b) a pneumatic pressure hose assembly having a pneumatic hose with a first pneumatic pressure connector on one end and a second pneumatic pressure connector on the other end where the first pneumatic pressure connector is connected to the manifold pressure valve on said airpipe manifold,
   (c) a pneumatic air flow hose assembly having a pneumatic hose with a first pneumatic flow connector on one end and a second pneumatic flow connector on the other end where the first pneumatic flow connector is connected to the cable pressure valve on said airpipe manifold,
   (d) a pneumatic/electronics unit,
   (e) a pneumatic pressure receptacle having, with respect to said pneumatic/electronics unit, an external end and an internal end, where the external end is connected to the second pneumatic pressure connector on said pneumatic pressure hose assembly,
   (f) a pneumatic flow receptacle having, with respect to said pneumatic/electronics unit, an external end and an internal end, where the external end is connected to the second pneumatic flow connector on said penumatic air flow hose assembly,
   (g) a pressure transducer having a pneumatic input and an electrical output where said transducer is used for converting the air pressure in the interior of said cable-sheath to a d-c voltage that is proportional to the air pressure,
   (h) a flow transducer having a pneumatic input, a pneumatic output, and an electrical output, where the pneumatic output is connected to the internal end of said pneumatic flow receptacle and where said transducer is used for converting the air flow rate being communicated through the interior of said cable-sheath to a d-c voltage that is proportional to the air flow rate, (i) a three port pneumatic connector where first port is connected to the internal end of said pneumatic pressure receptacle, where second port is connected to the pneumatic input of said pressure transducer and where the third port is connected to the pneumatic input of said flow transducer, (j) an analog-to-digital converter having an input and an output, where said converter is used to convert the air pressure and the air flow rate d-c voltages to equivalent digital signals, (k) an electrical read-pressure switch that when depressed the electrical output of said pressure transducer is applied to the input of said analog-to-digital converter, (l) an electrical read-flow switch that when depressed the electrical output of said flow transducer is applied to the input of said analog-to-digital converter, (m) an electronic calculator having a plurality of logic/digital circuits, computer program storage and retrieval circuits, and a computer program that solves the following set of equations that when solved provide distance and air flow data respectively that is used to limit the area of search of an air leak in said pressurized cable sheath, and where the digitized pressured and flow rate data used in the calculations are supplied from the output of said analog-to-digital converter:

$$D = \frac{1000\ P}{FR}$$

where

D = maximum distance in feet (meter) of air leak from the pressure source measuring point,
P = pressure in psi (kPa) in cable at a given location,
F = gas-flow rate in SCFH (m$^3$/hr) in cable sheath,
R = pneumatic resistance per 1000 feet (300 meter) of a particular size and gauge of cable, $$F = \frac{1000\ (P_1 - P_2)}{dr}$$

where

F = gas-flow rate in SCFH (m$^3$/hr) in cable sheath,
$P_1$ and $P_2$ = pressure readings in psi (kPa) of two pressure points in the cable sheath separated by a known distance d,
d = distance in feet (meter) between cable sheath pressure testing valves,
R = pneumatic resistance per 1000 feet (300 meter) of a particular size and gauge of cable, (n) a display connected to said electronics calculator, that displays for the user the interim data being set into the calculator and the final distance and air flow data as solved by the set of equations, and (o) a keyboard and BCD logic circuit connected to said electronics calculator that allows the user to selectively enter into said keyboard the entry commands relative to the interim pressure and gas flow data, as displayed on said display, as well as other data required to solve said set of equations.

6. The instrument as specified in claim 5 wherein said first pneumatic pressure connector and said first pneumatic flow connector are of the type that attach and lock respectively to the manifold pressure valve and the cable pressure valve located on said airpipe manifold.

7. The instrument as specified in claim 5 wherein said pneumactic pressure receptacle and said pneumatic flow receptacle are of the type that when not connected to their respective connectors are hermetically sealed.

8. The instrument as specified in claim 5 wherein said second pneumatic pressure connector and said second pneumatic flow connector are of the quick-disconnect type that when connected to their respective said pneumatic pressure receptacle and said pneumatic flow receptacle cause the hermetic seal in said receptacles to open.

9. The instrument as specified in claim 5 wherein said pneumatic/electronics unit is sized to include and retain all non-removable components of said pressurized cable-sheath leak locating instrument.

10. The instrument as specified in claim 5 wherein said computer program is written in a machine language peculiar to the microprocessor in said electronics calculator.

11. The instrument as specified in claim 5 wherein said computer program is non-volatile.

12. The instrument as specified in claim 5 wherein said display is comprised of an electronics digital display electronically connected to said electronics calculator.

13. The instrument as specified in claim 12 wherein said digital display has a horizontally stacked multiple line digital display.

14. The instrument as specified in claim 5 wherein said display is comprised of a hard-copy printer connected through a signal conditioning circuit to said electronics calculator and where said printer can be energized by means of a toggle switch.

15. The instrument as specified in claim 5 wherein said keyboard is color coded to facilitate the entry of data.

16. The instrument as specified in claim 5 wherein said pressure and air flow hoses are enclose in a flexible armored sheath.

17. The instrument as specified in claim 5 further comprising a table, affixed to said enclosure, listing the parameters of several types of pressurized cables where the selected parameters are keyed into said keyboard for use in the solution of said set of equations.

18. The instrument as specified in claim 5 wherein an optical scanner in combination with a light wand is used to input pressure and flow data into said calculator.

19. The instrument as specified in claim 5 further comprising a protective carrying case configured to hold said pneumatic/electronics unit and said printer and having a recessed area in which said pressure and air flow hoses can be stored.

* * * * *